United States Patent
Ikkanzaka

(10) Patent No.: US 9,591,156 B2
(45) Date of Patent: Mar. 7, 2017

(54) CONTROL APPARATUS AND MEDIUM TO TAKE OVER AND USE OPERATIONAL CONDITIONS FOR EXECUTING ONE OF PREDETERMINED FUNCTIONS OF AN IMAGE PROCESSING APPARATUS, AMONG THE MULTIPLE APPLICATIONS THAT HAVE BEEN EXECUTED

(71) Applicant: Hiroaki Ikkanzaka, Tokyo (JP)

(72) Inventor: Hiroaki Ikkanzaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 14/573,218

(22) Filed: Dec. 17, 2014

(65) Prior Publication Data

US 2015/0172485 A1    Jun. 18, 2015

(30) Foreign Application Priority Data

Dec. 18, 2013   (JP) ................................. 2013-261411
Dec. 9, 2014   (JP) ................................. 2014-248597

(51) Int. Cl.
    *H04N 1/00*              (2006.01)

(52) U.S. Cl.
    CPC ..... *H04N 1/00474* (2013.01); *H04N 1/00477* (2013.01); *H04N 1/00503* (2013.01); *H04N 2201/0094* (2013.01)

(58) Field of Classification Search
None
See application file for complete search history.

(56) References Cited

U.S. PATENT DOCUMENTS

| 2008/0001953 | A1* | 1/2008 | Nagao et al. ................. 345/502 |
| 2009/0198811 | A1* | 8/2009 | Yasui et al. ................... 709/223 |
| 2011/0296439 | A1* | 12/2011 | Kozaki ............. H04N 1/00954 719/318 |
| 2012/0212763 | A1* | 8/2012 | Honma ....................... 358/1.13 |

FOREIGN PATENT DOCUMENTS

| JP | 2011-130272 | 6/2011 |
| JP | 5051272 | 10/2012 |

* cited by examiner

*Primary Examiner* — Nicholas Pachol
*Assistant Examiner* — Pawandeep Dhingra
(74) *Attorney, Agent, or Firm* — IPUSA, PLLC

(57) ABSTRACT

A control apparatus configured to control operational conditions for executing functions of an image forming apparatus, includes an operational condition obtainment unit configured to read the operational conditions from a memory of the image forming apparatus; a display unit configured to display an operational condition setting screen for setting operational conditions corresponding to a function to be executed based on the operational conditions obtained by the operational condition obtainment unit, when executing the function; and a control unit configured to control the operational conditions to execute the function based on the operational conditions set on the operational condition setting screen. On the operational condition setting screen, a user can select whether to take over the operational conditions obtained by the operational condition obtainment unit.

5 Claims, 9 Drawing Sheets

FIG.7A

SETTING SCREEN — FAX APP B

FAX FUNCTION

CURRENT SETTING
* SELECT WHETHER TO TAKE OVER.

| ITEM | OPERATIONAL CONDITION |
|---|---|
| ADDRESS | MR. ** |
| DENSITY | DENSE |
| RESOLUTION | FINE |
| READING SIZE | A4 |
| DOCUMENT SURFACES | SINGLE SURFACE |

NO TAKEOVER

TAKEOVER

FIG.7B

SETTING SCREEN — FAX APP B

FAX FUNCTION

* CHECK TAKEOVER ITEMS.

TAKEOVER SELECTION — ALL

| ITEM | OPERATIONAL CONDITION |
|---|---|
| ADDRESS | MR. ** |
| DENSITY | DENSE ▼ |
| RESOLUTION | FINE ▼ |
| READING SIZE | A4 ▼ |
| DOCUMENT SURFACES | SINGLE SURFACE ▼ |

FIG.8A

SETTING SCREEN — FAX APP B

FAX FUNCTION

ERRORS IN TAKEOVER ITEMS
* SELECT WHETHER TO TAKE OVER.

| ITEM | OPERATIONAL CONDITION | ERROR |
|---|---|---|
| ADDRESS | MR. ** | |
| DENSITY | DENSE | |
| RESOLUTION | FINE | |
| READING SIZE | A2 | ERR |
| DOCUMENT SURFACES | SINGLE SURFACE | |

NO TAKEOVER

TAKEOVER

FIG.8B

SETTING SCREEN — FAX APP B

FAX FUNCTION

ERRORS IN TAKEOVER ITEMS
* CHECK TAKEOVER ITEMS.

TAKEOVER SELECTION — ALL

| ITEM | OPERATIONAL CONDITION | ERROR |
|---|---|---|
| ADDRESS | MR. ** | |
| DENSITY | DENSE ▼ | |
| RESOLUTION | FINE ▼ | |
| READING SIZE | A2 ▼ | ERR |
| DOCUMENT SURFACES | SINGLE SURFACE ▼ | |

CONTROL APPARATUS AND MEDIUM TO TAKE OVER AND USE OPERATIONAL CONDITIONS FOR EXECUTING ONE OF PREDETERMINED FUNCTIONS OF AN IMAGE PROCESSING APPARATUS, AMONG THE MULTIPLE APPLICATIONS THAT HAVE BEEN EXECUTED

BACKGROUND OF THE INVENTION

1. Field of the Invention

The disclosures herein generally relate to a control apparatus and a medium.

2. Description of the Related Art

There are cases where multiple application functions of an image forming apparatus are set with respective operational conditions. In such a case, a technology has already been known that determines a combination of applications that realize their functions with operational conditions to be set, to execute the applications (see, for example, Patent Document 1).

There are cases where when a conventional image forming apparatus is going to execute one of the functions of the apparatus, the conventional image forming apparatus cannot take over operational conditions for executing the function, from the other multiple applications that have been executed.

It is a general object of at least one embodiment of the present invention to provide an image forming apparatus that substantially obviates one or more problems caused by the limitations and disadvantages of the related art. Specifically, it may be desirable to make it possible to take over and use operational conditions for executing one of predetermined functions of an image processing apparatus, among the multiple applications that have been executed.

RELATED-ART DOCUMENTS

Patent Documents

[Patent Document 1] Japanese Patent No. 5051272

SUMMARY OF THE INVENTION

According to at least one embodiment of the present invention, a control apparatus configured to control operational conditions for executing functions of an image forming apparatus, includes an operational condition obtainment unit configured to read the operational conditions from a memory of the image forming apparatus; a display unit configured to display an operational condition setting screen for setting operational conditions corresponding to a function to be executed based on the operational conditions obtained by the operational condition obtainment unit, when executing the function; and a control unit configured to control the operational conditions to execute the function based on the operational conditions set on the operational condition setting screen. On the operational condition setting screen, a user can select whether to take over the operational conditions obtained by the operational condition obtainment unit.

According to at least one embodiment of the present invention, it is possible to take over and use operational conditions for executing one of predetermined functions of an image processing apparatus, among the multiple applications that have been executed.

BRIEF DESCRIPTION OF DRAWINGS

FIGS. 7A-7B are diagrams illustrating an example of setting screens to select and set whether to take over operational conditions according to the first embodiment;

FIGS. 8A-8B are diagrams illustrating an example of setting screens to select and set whether to take over operational conditions when an error occurs according to the first embodiment.

DESCRIPTION OF THE PREFERRED EMBODIMENTS

It is often the case that an image forming apparatus does not store multiple sets of operational conditions to execute one of functions among multiple functions implemented on the image forming apparatus. Therefore, it is often the case that an image forming apparatus stores only one set of operational conditions for one function. Consequently, when a user has multiple different applications that execute the same function, the user needs to set operational conditions individually for each of the applications. Therefore, the user needs to repeat the same setting for the respective applications.

A control apparatus according to an embodiment of the present invention can have operational conditions be taken over for executing one of the functions of an image forming apparatus, among multiple functions implemented on the image forming apparatus. Therefore, a user less frequently needs to repeat the same setting.

(Overall Configuration Example of Embodiment)

In the following, embodiments of the present invention will be described with reference to the drawings.

Figure 1:
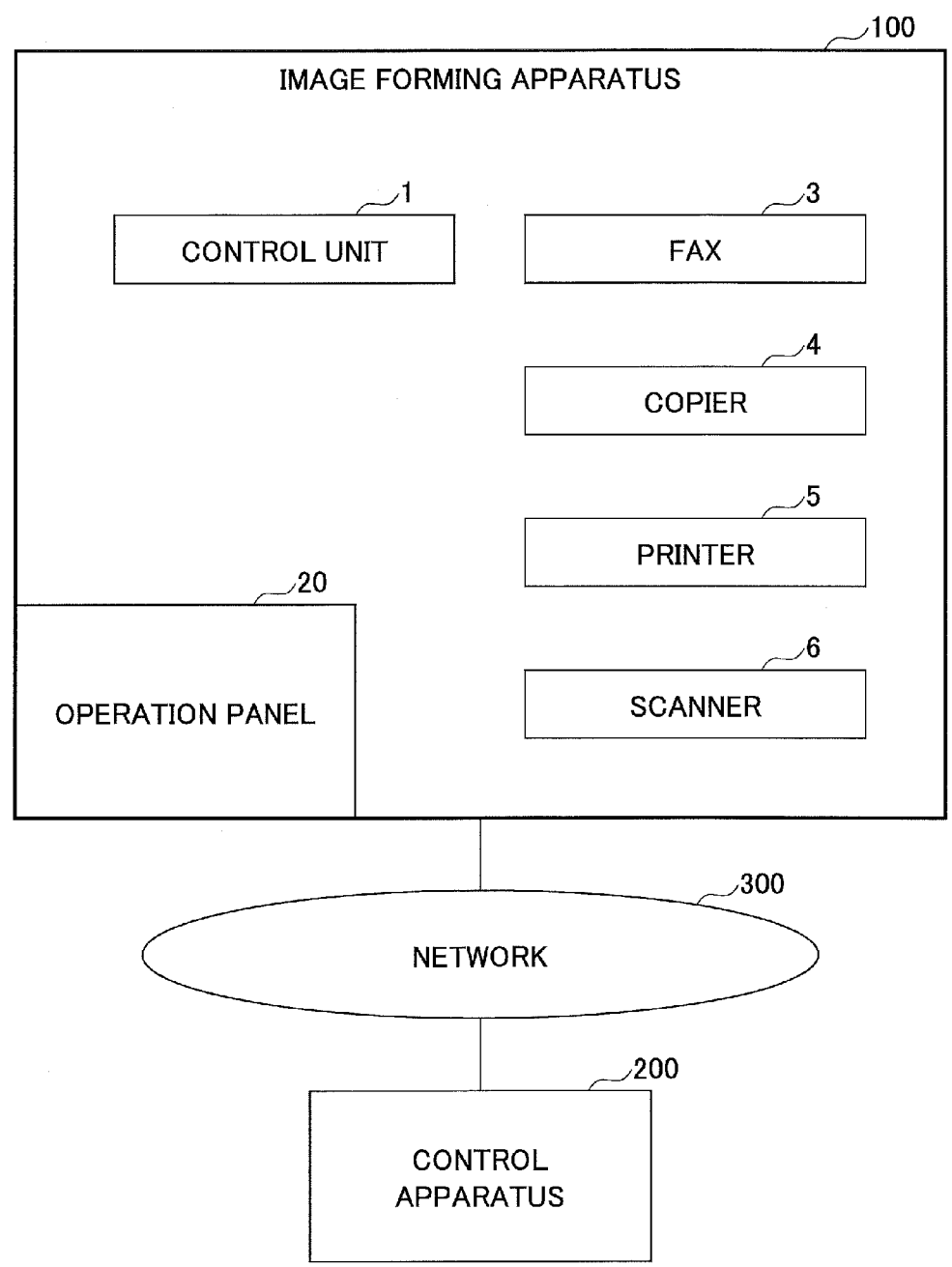
FIG. 1 is a diagram illustrating a configuration example of an image forming apparatus according to a first embodiment of the present invention.

FIG. 1 is a diagram illustrating a configuration example of an image forming apparatus 100 according to a first embodiment.

The image forming apparatus 100 illustrated in FIG. 1 includes an operation panel 20, a control unit 1, a FAX 3, a copier 4, a printer 5, and a scanner 6 of the image forming apparatus 100. Also, the image forming apparatus 100 is connected with a control apparatus 200 via a network 300. Further, the control apparatus 200 may have respective functions included in the image forming apparatus 100 executed via the network 300, and be capable of controlling the image forming apparatus 100.

Note that the image forming apparatus 100 may be configured without the operation panel 20. Also, the image forming apparatus 100 may be configured to include the control apparatus 200 as the operation panel 20.

In this case, the image forming apparatus 100 and the control apparatus 200 may be configured to be directly connected with a data bus of the image forming apparatus 100. Also, the operation panel 20 may be configured to be directly connected with the data bus.

The control unit 1 receives a command from the control apparatus 200, and executes a process relating to multiple functions included in the image forming apparatus 100. Also, the control unit 1 controls the image forming apparatus 100 as a whole. Functions included in the image forming apparatus 100 are those of a FAX, a printer, a copier, and a scanner. These functions are implemented by having a FAX 3, a printer 5, a copier 4, and a scanner 6 execute respective processes, based on control of the control unit 1.

Further, when the respective processes have been executed based on these functions, the control unit 1 stores a set of operational conditions for each of the functions, to have the operational conditions stored in the image forming apparatus 100. Note that the control unit 1 provides the stored operational conditions when receiving a query from the control apparatus 200.

Also, the image forming apparatus 100 has multiple applications installed that are executed via the control unit 1. These applications are programs to execute respective functions included in the image forming apparatus 100, which are selectable by a user via the control apparatus 200. Next, the image forming apparatus 100 executes various processes based on the applications.

For example, suppose that a user wants to send a text document and an image document to the same person by FAX transmission. In this case, the control apparatus has applications for FAX transmission installed, one is a "FAX application A" for text transmission, and the other is a "FAX application B" for image transmission.

The user uses the "FAX application A" when transmitting the text. Similarly, the user uses the "FAX application B" when transmitting the image.

After the "FAX application A" has been used, the image forming apparatus 100 stores a set of operational conditions set with the "FAX application A" in the apparatus. Next, when the user switches the applications, the control apparatus may have the user select whether to take over the operational conditions set with the "FAX application A" for the "FAX application B" to be used next.

For example, the control apparatus may take over operational conditions used with the "FAX application A" such as "reading document size (A4)", "address (Mr. **)", and "document surfaces (single surface)", for the "FAX application B". In contrast to this, the control apparatus may not take over operational conditions such as "resolution (fine)" and "density (normal)" for the "FAX application B".

The operational conditions not taken over as selected by the user, are set with initial values stored (values set in advance) by the application. Therefore, according to the present embodiment of the present invention, the image forming apparatus can take over and use operational conditions previously set when switching the applications having predetermined functions. Note that the initial values are values of respective items relating to the operational conditions that are set by the application in advance.

(Hardware Configuration Example of Embodiment).

Figure 2:
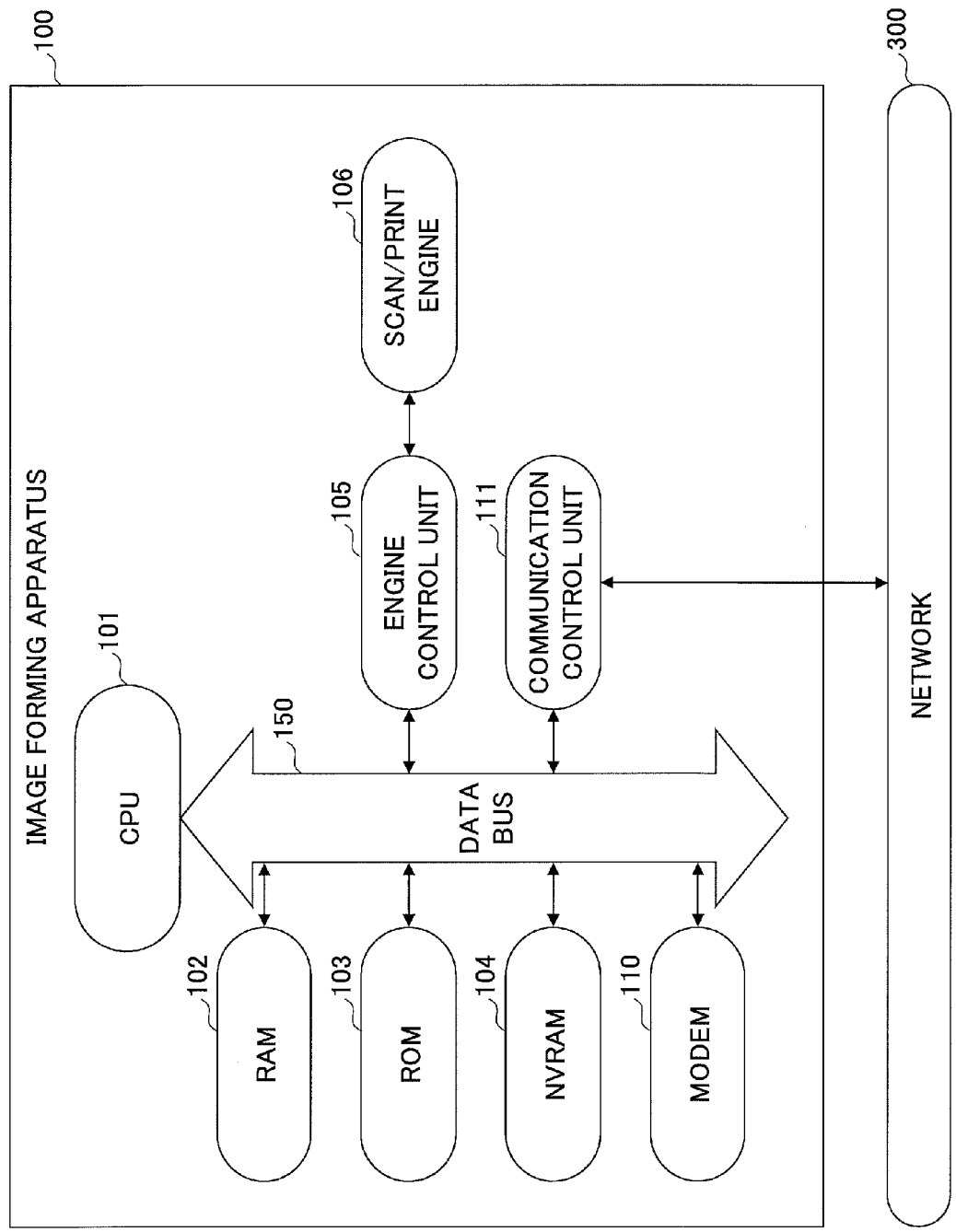
FIG. 2 is a diagram illustrating a hardware configuration example of an image forming apparatus without an operation panel 20 according to the first embodiment.

FIG. 2 is a diagram illustrating a hardware configuration example of the image forming apparatus 100 without the operation panel 20 according to the first embodiment.

The image forming apparatus 100 includes a CPU (Central Processing Unit) 101, a RAM (Random Access Memory) 102, and a ROM (Read-Only Memory) 103. The image forming apparatus 100 further includes an NVRAM (Non-Volatile RAM) 104, an engine control unit 105, a scan/print engine 106, a modem 110, a communication control unit 111, and a data bus 150.

The RAM 102, the ROM 103, and the NVRAM 104 are connected with each other via the data bus 150. Also, the control unit 1 (FIG. 1) controls execution of multiple functions included in the image forming apparatus 100, under control of the CPU 101. Specifically, functions of the FAX 3, copier 4, printer 5, and scanner 6 illustrated in FIG. 1 are implemented by the engine control unit 105, the scan/print engine 106, and the modem 110 that are controlled by the CPU 101 via the data bus 150. Also, a connection to the control apparatus 200 is executed via the communication control unit 111 under control of the CPU 101.

The CPU 101 executes control and calculation relating to the apparatus as a whole.

The RAM 102 is used for a temporary storage area.

The ROM 103 stores programs, fonts, and other static data.

The NVRAM 104 stores non-volatile data. Also, the NVRAM 104 stores operational conditions relating to functions included in the image forming apparatus 100.

The engine control unit 105 and the scan/print engine 106 are input/output units of image data, to execute capturing images formed on paper documents, and printing images on sheets.

The modem 110 is connected with a public telephone line to make FAX communication with external apparatuses possible.

The communication control unit 111 is connected with the network 300 such as an Ethernet (trademark) or a wireless LAN to make FAX communication with external apparatuses possible. Also, the communication control unit 111 transmits and receives data such as operational conditions relating to the functions included in the image forming apparatus 100, with the communication control unit 211.

Note that the CPU 101, RAM 102, ROM 103, NVRAM 104, engine control unit 105, modem 110, and communication control unit 111 transmits and receives various data with each other via the data bus 150.

In the following, an example will be described in which a FAX transmission is executed using the "FAX application A" and "FAX application B". First, the control unit 1 of the image forming apparatus 100 (FIG. 1) receives a command to use the FAX 3 from the control apparatus 200 via the communication control unit 111 connected with the network 300.

Next, the CPU 101 included in the control unit 1 stores contents of the command from the control apparatus 200 received by the communication control unit 111 connected with the data bus 150, in a predetermined area in the RAM 102. In this case, depending on the contents of the command from the control apparatus 200, setting items relating to the engine control unit 105 are set by the CPU 101.

Further, the engine control unit 105 controls the scan/print engine 106 to store communication data for FAX in the RAM 102. In this case, the CPU 101 sets operational conditions of the modem 110 by the command from the control apparatus 200. Also, the CPU 101 makes FAX transmission of FAX data captured via the engine control unit 105 to a communication partner by the modem 110.

Figure 3:
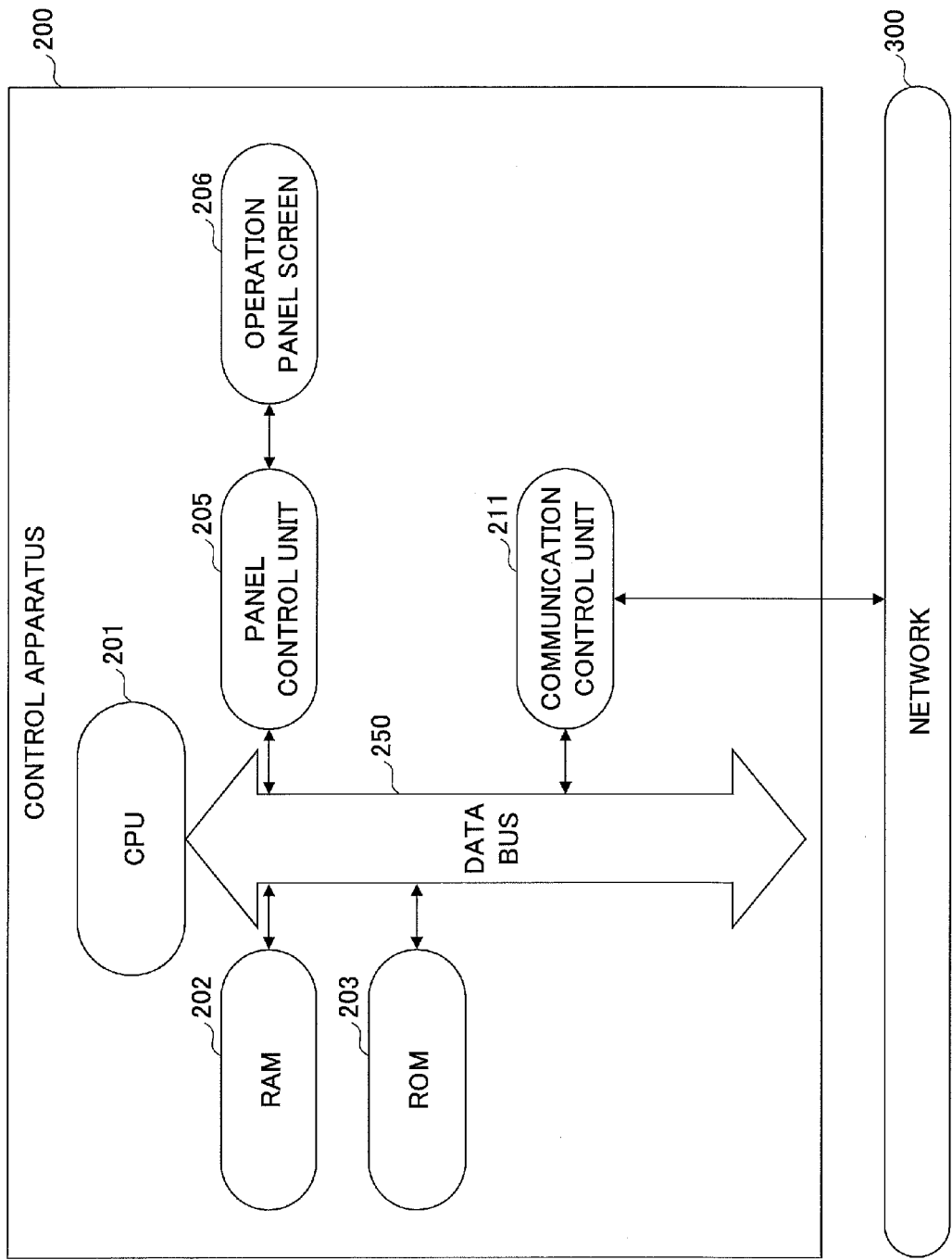
FIG. 3 is a diagram illustrating a hardware configuration example of a control apparatus according to the first embodiment.

FIG. 3 is a diagram illustrating a hardware configuration example of the control apparatus 200 according to the first embodiment.

The control apparatus 200 includes a CPU 201, a RAM 202, a ROM 203, a panel control unit 205, an operation panel screen 206, a communication control unit 211, and a data bus 250.

The CPU 201 executes control and calculation relating to the apparatus as a whole.

The RAM 202 is used for a temporary storage area.

The ROM 203 stores programs, fonts, and other static data.

The panel control unit 205 and the operation panel screen 206 constitute an interface to a user. Specifically, a menu of applications and a setting screen showing whether to take over operational conditions are displayed for a user by the operation panel screen 206 via the panel control unit 205 included in the control apparatus 200.

The communication control unit 211 is connected with the network 300 such as an Ethernet or a wireless LAN, to make FAX communication with external apparatuses possible. Also, the communication control unit 211 transmits and receives data such as operational conditions relating to the functions included in the image forming apparatus 100, with the communication control unit 111.

Note that the CPU 201, RAM 202, ROM 203, panel control unit 205, and communication control unit 211 transmit and receive various data with each other via the data bus 250.

(Functional Configuration Example of Embodiment)

Figure 4:
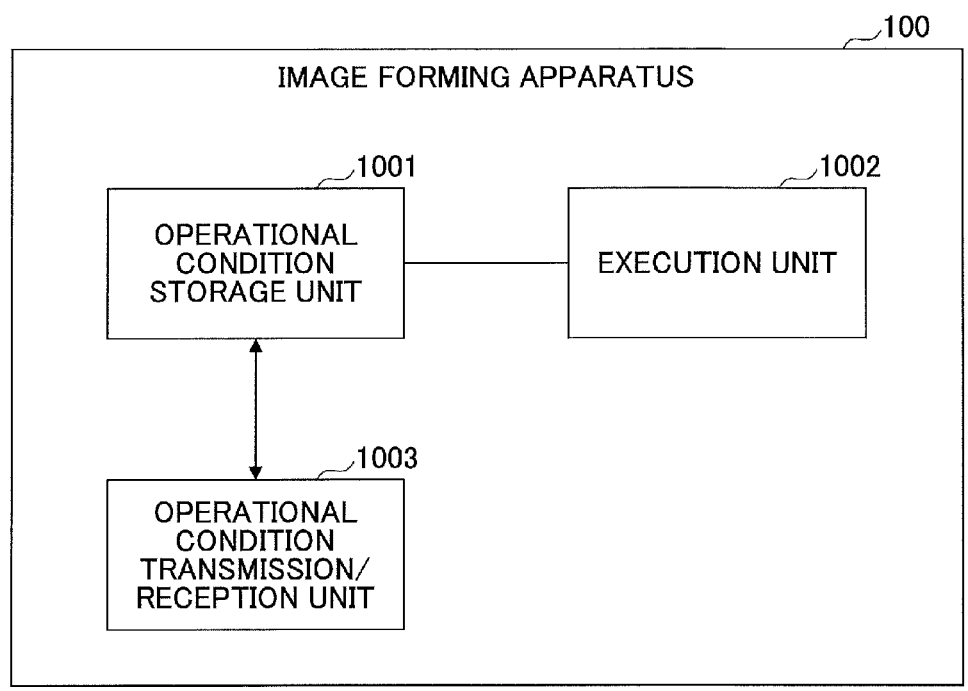
FIG. 4 is a diagram illustrating a functional configuration example of an image forming apparatus according to the first embodiment.

FIG. 4 is a diagram illustrating a functional configuration example of the image forming apparatus 100 according to the first embodiment.

The image forming apparatus 100 includes an operational condition storage unit 1001, an execution unit 1002, and an operational condition transmission/reception unit 1003.

The operational condition storage unit 1001 stores operational conditions in the NVRAM 104 (FIG. 2) based on control of the CPU 101 (FIG. 2).

Also, the execution unit 1002 reads out operational conditions from the NVRAM 104 based on control of the CPU 101. Next, based on control of the CPU 101, the execution unit 1002 sets the engine control unit 105 (FIG. 2), the scan/print engine 106 (FIG. 2), and the modem 110 (FIG. 2) to operate under the read-out operational conditions. In addition, the CPU 101 executes a function specified by the control apparatus 200 via the communication control unit 111 (FIG. 2).

Also, the operational condition transmission/reception unit 1003 transmits and receives data specifying operational conditions via the communication control unit 111 (FIG. 2) based on control of the CPU 101.

Functions such as printing, scanning, and FAX are stored as programs in the ROM 103 (FIG. 2) or the like, and the functions are executed by the CPU 101 based on the stored programs. Also, the RAM 102 (FIG. 2) stores variables and the like that are required to execute various processes.

The operational condition storage unit 1001 receives a command for setting operational conditions from the control apparatus 200 (FIG. 3). Next, the operational condition storage unit 100 replaces currently set operational conditions with contents of the operational conditions received from the control apparatus 200.

The execution unit 1002 receives a command to execute an operation from the control apparatus 200. Next, the execution unit 1002 executes various processes with reference to the operational conditions set in the operational condition storage unit 1001.

When receiving a request for providing the operational conditions from the control apparatus 200, the operational condition transmission/reception unit 1003 obtains data of the operational conditions from the operational condition storage unit 1001, to provide it to the control apparatus 200. Also, when receiving the request for setting operational conditions from the control apparatus 200, the operational condition transmission/reception unit 1003 transfers the operational conditions provided by the control apparatus 200 to the operational condition storage unit 1001. Next, the operational condition storage unit 1001 replaces the stored operational conditions with the operational conditions provided by the control apparatus 200.

An example will be described for a case where a request for FAX transmission comes from the control apparatus 200, for example. In this case, the modem 110, the engine control unit 105, and the scan/print engine 106, as an example of the execution unit 1002, are set with the operational conditions that are stored in the NVRAM 104, as an example of the operational condition storage unit 1001, by the CPU 101, respectively. Next, FAX transmission is executed.

Also, the operational condition transmission/reception unit 1003 receives a command from the control apparatus 200 via the network by the communication control unit 111. In this case, the operational condition storage unit 1001 provides operational conditions stored in the NVRAM 104 to the control apparatus 200.

Alternatively, the operational condition transmission/reception unit 1003 may receive a command to set operational conditions from the control apparatus 200, and transfers the operational conditions provided by the control apparatus 200 to the operational condition storage unit 1001. In this case, the operational condition storage unit 1001 replaces the operational conditions stored in the NVRAM 104 with the operational conditions provided by the control apparatus 200.

Figure 5:
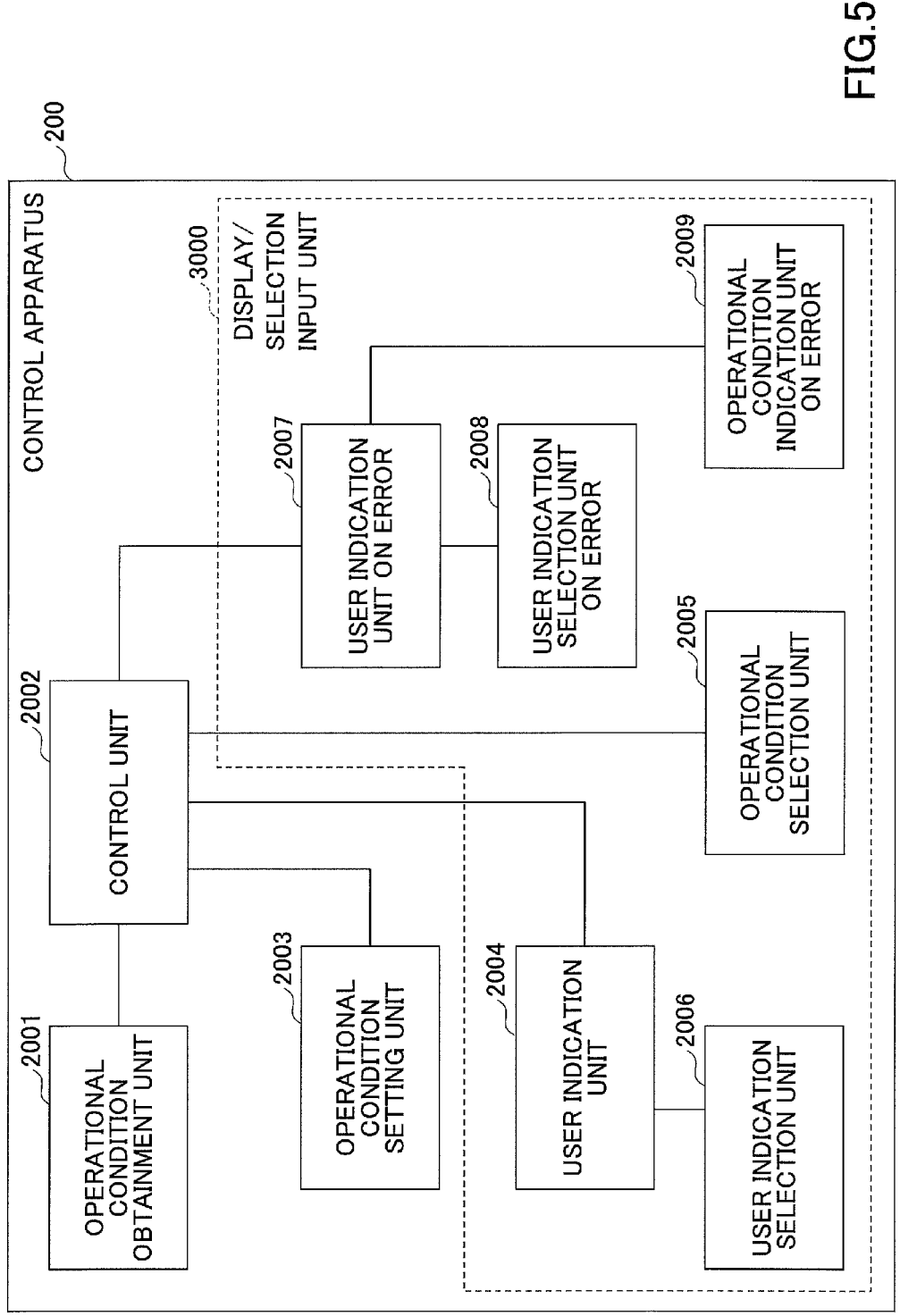
FIG. 5 is a diagram illustrating a functional configuration example of a control apparatus according to the first embodiment.

FIG. 5 is a diagram illustrating a functional configuration example of the control apparatus 200 according to the first embodiment.

The control apparatus 200 includes an operational condition obtainment unit 2001, a control unit 2002, an operational condition setting unit 2003, a user indication unit 2004, and an operational condition selection unit 2005. The control apparatus 200 further includes a user indication selection unit 2006, a user indication unit on error 2007, a user indication selection unit on error 2008, and an operational condition indication unit on error 2009.

Also, the user indication unit 2004, the operational condition selection unit 2005, the user indication selection unit 2006, the user indication unit on error 2007, the user indication selection unit on error 2008, and the operational condition indication unit on error 2009 implement a function relating to the user interface. Specifically, the function relating to the user interface displays a screen to receive input from a user, on which the user can make a selection input. In the following, the user indication unit 2004, the operational condition selection unit 2005, the user indication selection unit 2006, the user indication unit on error 2007, the user indication selection unit on error 2008, and the operational condition indication unit on error 2009 are collectively referred to as the display/selection input unit.

The operational condition obtainment unit 2001 obtains operational conditions from the image forming apparatus 100 (FIG. 1) via the communication control unit 211 based on control of the CPU 201 (FIG. 3).

The control unit 2002 controls the operational condition obtainment unit 2001, the operational condition setting unit 2003, the user indication unit 2004, the operational condition selection unit 2005, and the user indication selection unit 2006, based on control of the CPU 201. Further, the control unit 2002 controls the user indication unit on error 2007, the user indication selection unit on error 2008, and the operational condition indication unit on error 2009, based on control of the CPU 201.

The operational condition setting unit 2003 provides operational conditions relating to the functions included in the image forming apparatus 100 via the communication control unit 211, based on control of the CPU 201.

The user indication unit 2004 has the operation panel screen 206 (FIG. 3) display a setting screen on which a user can select whether to take over operational conditions individually, in accordance with the command by the user indication selection unit 2006, based on control of the CPU 201 via the panel control unit 205 (FIG. 3).

The operational condition selection unit 2005 has the operation panel screen 206 display the operational conditions, based on control of the CPU 201 via the panel control unit 205 (FIG. 3).

The user indication selection unit 2006 issues a command to the user indication unit 2004, in response to a selection by the user input on the operation panel screen 206, based on control of the CPU 201.

When there are operational conditions not possible to take over, the user indication unit on error 2007 displays a screen to select whether to take over operational conditions possible to take over on the operation panel screen 206, based on control of the CPU 201 via the panel control unit 205 (FIG. 3).

The user indication selection unit on error 2008 issues a command to the user indication unit on error 2007, in response to the selection result by the user, based on control of the CPU 201.

When there are operational conditions not possible to take over, the operational condition indication unit on error 2009 displays on the operation panel screen 206, operational conditions possible to take over, and the operational conditions not possible to take over, respectively, based on control of the CPU 201 via the panel control unit 205 (FIG. 3). In this case, the operational condition indication unit on error 2009 displays a screen to select whether to take over the operational conditions possible to take over.

These functions are executed by the CPU 201 based on a program recorded in the ROM 203 (FIG. 3) or the like. In this case, the RAM 202 (FIG. 2) stores variables and the like that are required for the execution.

The operational condition obtainment unit 2001 includes a function to obtain operational conditions from the image forming apparatus 100. For example, the operational condition obtainment unit 2001 included in the control apparatus 200 transmits a request for providing operational conditions relating to a function such as FAX, to the image forming apparatus 100 connected with the control apparatus 200 via the network 300. Next, in response to the request for providing the operational conditions, the operational condition transmission/reception unit 1003 included in the image forming apparatus 100 obtains the operational conditions relating to the function such as FAX, stored in the operational condition storage unit 1001 included in the image forming apparatus 100. Further, the operational condition transmission/reception unit 1003 transmits the obtained operational conditions relating to the function such as FAX to the operational condition obtainment unit 2001 included in the control apparatus 200 via the network 300.

By the above steps, the operational condition obtainment unit 2001 included in the control apparatus 200 can obtain the operational conditions relating to the function such as FAX stored in the image forming apparatus 100 from the image forming apparatus 100.

The control unit 2002 controls various functions (including 2001, and 2003 to 2009) included in the control apparatus 200. For example, when executing the FAX function, the operational condition obtainment unit 2001 first obtains operational conditions relating to the FAX function from the operational condition storage unit 1001 included in the image forming apparatus 100. Next, the control unit 2002 issues a command to the user indication unit 2004 to display a "setting screen to determine whether to take over operational conditions relating to the FAX function obtained" from the image forming apparatus 100. In the following, the "setting screen to determine whether to take over operational conditions relating to the FAX function obtained" will be referred to as the "operational condition takeover setting screen".

Also, the control unit 2002 is indicated by the user indication unit 2004 that the "operational condition takeover setting screen" is displayed, and then, receives a selection by a user. In addition, the control unit 2002 receives the selection result by the user having determined whether to take over the operational conditions on the "operational condition takeover setting screen". When the operational conditions are to be taken over, the control unit 2002 indicates the operational conditions obtained from the image forming apparatus 100 to the operational condition selection unit 2005 included in the control apparatus 200. On the other hand, when the operational conditions are not to be taken over, the control unit 2002 issues a command to the operational condition setting unit 2003 to register the initial values.

Also, an error may occur for a takeover of operational conditions. In such a case, the control unit 2002 issues a command to the user indication unit on error 2007 to display a screen to select whether to take over only the operational conditions possible to take over.

Also, when not having the user indication unit on error 2007 display a screen to select whether to take over only the operational conditions possible to take over, the control unit 2002 indicates to the operational condition setting unit 2003 of the control apparatus 200 to set the initial values.

On the other hand, when the control unit 2002 is indicated by the user indication unit on error 2007 that the screen to select whether to take over only the operational conditions possible to take over has been displayed, the control unit 2002 receives a selection by the user. Next, when receiving a selection result by the user having determined whether to take over operational conditions possible to take over, the control unit 2002 indicates the operational conditions possible to take over, and the operational conditions not possible to take over, to the operational condition indication unit on error 2009. Further, the control unit 2002 receives the selection whether to take over operational conditions from the operational condition indication unit on error 2009, deletes items of the operational conditions not to be taken over, and transitions to a state where no operational conditions are set.

The operational condition setting unit 2003 issues a command to the operational condition storage unit 1001 included in the image forming apparatus 100 to set the operational conditions via the network 300. Next, the operational condition storage unit 1001 executes setting to replace the currently set operational conditions with the operational conditions transmitted from the control apparatus 200.

Note that if there are items not having set among the operational conditions transmitted from the control apparatus 200, the operational condition setting unit 2003 sets the initial values for those items on the image forming apparatus 100.

When receiving the command to display the "operational condition takeover setting screen" from the control unit 2002, the user indication unit 2004 operates following a command to display or not to display the "operational condition takeover setting screen" from the user indication selection unit 2006. Also, the user indication unit 2004 displays the "operational condition takeover setting screen" on the control apparatus 200 by the command from the user indication selection unit 2006.

The operational condition selection unit 2005 displays on the control apparatus 200 a setting screen on which selections can be made individually whether to take over operational conditions obtained from the image forming apparatus. Next, the operational condition selection unit 2005 receives a selection by the user on the setting screen.

The user indication selection unit 2006 displays a screen to select whether to display the "operational condition takeover setting screen", receives a selection by the user, on the control apparatus 200. Alternatively, based on the selection by the user, the user indication selection unit 2006 issues a command to the user indication unit 2004 to display or not to display the "operational condition takeover setting screen".

When not going to display the "operational condition takeover setting screen" based on the selection by the user, the user indication selection unit 2006 issues a command to the user indication unit 2004 not to display the "operational condition takeover setting screen". On the other hand, when going to display the "operational condition takeover setting screen" based on the selection by the user, the user indication selection unit 2006 issues a command to the user indication unit 2004 to display the "operational condition takeover setting screen".

Also, the user indication selection unit 2006 receives a command to display or not to display the screen to select whether to take over operational conditions from the control apparatus 200. Next, the user indication selection unit 2006 issues a command to the user indication unit 2004 to display or not to display the screen to select whether to take over operational conditions.

Note that it is not always true that all values of operational conditions stored in the image forming apparatus 100 are correct. For example, if a user sets a "document surfaces" condition of the FAX function with a value "both surfaces", and executes the FAX function, but the image forming apparatus 100 does not have a function to scan "both surfaces", the setting may result in an error. In this case, the image forming apparatus 100 stores the operational conditions that lead to an error.

Namely, if the user executes the application again, the operational conditions read out of the image forming apparatus 100 are set to scan "both surfaces", which include an erroneous setting with respect to the functions included in the image forming apparatus 100. In this case, the user may correct the erroneous operational conditions so that the image forming apparatus 100 can be used normally. To achieve this, the user indication unit on error 2007, the user indication selection unit on error 2008, and the operational condition indication unit on error 2009 function as follows.

The user indication unit on error 2007 operates following the command to display or not to display the "screen to select whether to take over operational conditions possible to take over" from the user indication selection unit on error 2008 included in the control apparatus 200. Next, when receiving the command to display, the user indication unit on error 2007 displays the "screen to select whether to take over operational conditions possible to take over". On the other hand, when receiving the command not to display, the user indication unit on error 2007 does not display the "screen to select whether to take over operational conditions possible to take over".

The user indication selection unit on error 2008 displays a screen to select whether to display the "screen to select whether to take over operational conditions possible to take over" on the control apparatus 200, and receives a selection by the user. Alternatively, based on the selection by the user, the user indication selection unit on error 2008 issues a command to the user indication unit on error 2007 to display or not to display the "screen to select whether to take over operational conditions possible to take over". Or, when not going to display the "screen to select whether to take over operational conditions possible to take over" based on the selection by the user, the user indication selection unit on error 2008 issues a command to the user indication unit on error 2007 not to display the selection screen. On the other hand, when going to display the "screen to select whether to take over operational conditions possible to take over" based on the selection by the user, the user indication selection unit on error 2008 issues a command to the user indication unit on error 2007 to display a "screen to select whether to take over operational conditions possible to take over".

The operational condition indication unit on error 2009 displays the operational conditions possible to take over, and the operational conditions not possible to take over, on the operation panel screen 206. Next, the operational condition indication unit on error 2009 receives a selection by the user determining whether to take over the operational conditions possible to take over.

The display/selection input unit 3000 is a part or an example of a display unit. The display/selection input unit 3000 may display an operational condition setting screen to set operational conditions corresponding to a function to be executed based on operational conditions obtained from the operational condition transmission/reception unit 1003 included in the image forming apparatus 100.

Note that the operational condition setting screen may be a setting screen that displays the obtained operational conditions, with which a collective selection can be made whether to take over all of them. Also, the setting screen may display a screen on which a user can select items preferably taken over among multiple setting items.

Further, if operational conditions input by a user, or operational conditions obtained from the image forming apparatus, are out of a range of the operational conditions of an apparatus to operate, these operational conditions cannot be taken over, which are indicated as errors to the user on the operational condition setting screen. Also, the operational condition setting screen may display a setting screen to select operational conditions possible to take over.

The CPU 201 included in the control apparatus 200 controls functions included in the operational condition obtainment unit 2001, the control unit 2002, the operational condition setting unit 2003, and functions included in the display/selection input unit 3000. These functions are executed by the CPU 201 based on a program recorded in the ROM 203 or the like. Also, the RAM 202 stores variables and the like that are required for execution.

When displaying a screen to select operational conditions or the like, the CPU 201 reads screen data stored in the RAM 202 via the data bus 250. Next, the CPU 201 transfers the screen data to the panel control unit 205, and issues a command to the operation panel screen 206 to display the screen.

Also, the operational condition obtainment unit 2001 included in the control apparatus 200 obtains operational conditions stored in the operational condition storage unit 1001 from the operational condition transmission/reception unit 1003 included in the image forming apparatus 100 by the communication control unit 211 via the network 300.

Also, the operational condition setting unit 2003 included in the control apparatus 200 provides the operational conditions to the operational condition transmission/reception unit 1003 included in the image forming apparatus 100 by the communication control unit 211 via the network 300. Next, the operational condition setting unit 2003 included in the control apparatus 200 issues a command to the operational condition storage unit 1001 to replace the operational conditions.

Figure 6A:
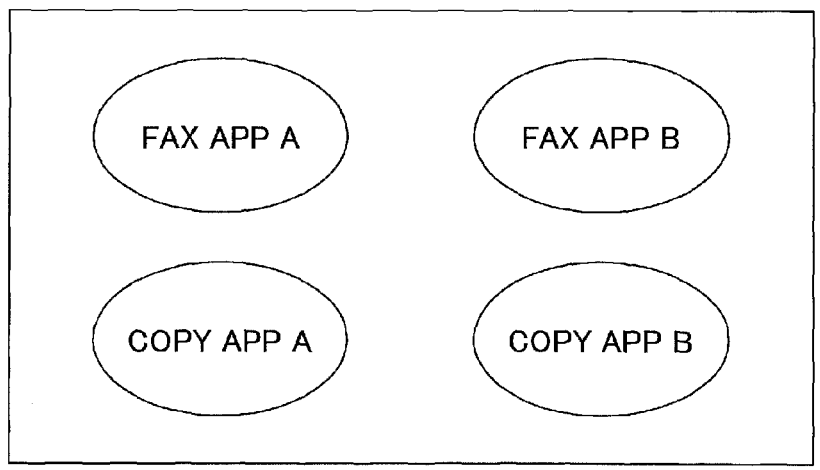
FIGS. 6A-6C are diagrams illustrating a display example of operation panel screens.
Figure 6B:
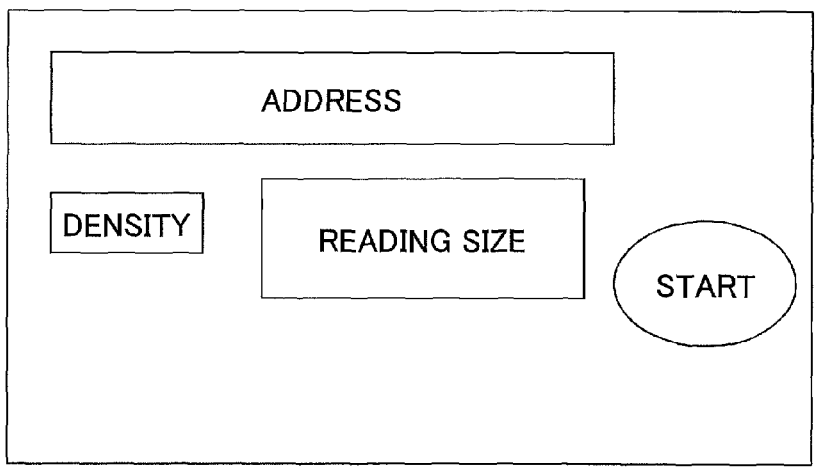
Figure 6C:
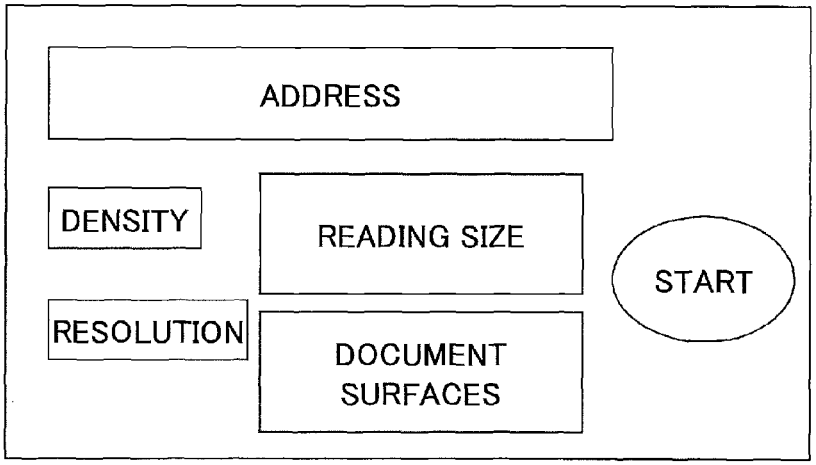

FIGS. 6A-6C are diagrams illustrating a display example of operation panel screens.

FIG. 6A illustrates an example of a selection screen relating to a setting of applications displayed on a display screen of the control apparatus 200. In this case, two applications for FAX transmission, a "FAX application A" and a "FAX application B" are displayed on the selection screen. Similarly, two applications for copying, "copy application A" and "copy application B" are displayed on the selection screen.

In the following, an example will be described in which the display panel screen included in the control apparatus 200 has a user interface including a touch function. In this case, a position displaying one of the applications on the display screen of the control apparatus 200 is touched by a finger or the like, the application displayed at the touched position is selected, and is executed. On the other hand, if the display screen of the control apparatus 200 does not have a touch function, the application displayed at the touched position is selected and executed by pressing operational buttons or the like installed on the control apparatus 200.

FIG. 6B illustrates an example of a display screen on the operation panel when the user selects the "FAX application A". Specifically, when the selection button of the application is pressed, the control apparatus 200 has the user select whether to take over operational conditions. Therefore, the control apparatus 200 displays a setting screen to select whether to take over operational conditions on the display screen of the control apparatus 200.

For example, setting items relating to the "FAX application A" include three items of "address", "density", and "reading size" as illustrated in FIG. 6B. In this case, the user fills in the three items of "address", "density", and "reading size". Next, the user sets a document to be transmitted, and presses a start button to execute FAX transmission by the "FAX application A".

The control unit 1 (FIG. 1) recognizes a state of operations of the user on the operation screen by various data obtained from the control apparatus 200. Specifically, the operational conditions set with the setting items relating to the "FAX application A" are transferred from the control apparatus 200 to the control unit 1. Next, the control unit 1 sets the operational conditions of the FAX 3 (FIG. 1) and the scanner 6 (FIG. 1) required for the FAX transmission, and executes the FAX transmission by predetermined steps. In this case, the operational conditions set when executing the FAX transmission are stored in the image forming apparatus.

Note that FIG. 6B is an example of a setting screen when not all operational conditions are taken over on the operational condition setting screen of the "FAX application A".

FIG. 6C illustrates an example of a display screen on the operation panel when the user selects the "FAX application B". Specifically, similarly to FIG. 6B, when the selection button of the application is pressed, the control apparatus 200 has the user select whether to take over operational conditions. Therefore, similarly to FIG. 6B, the control apparatus 200 displays a setting screen to select whether to take over operational conditions on the display screen of the control apparatus 200.

For example, setting items relating to the "FAX application B" include five items of "address", "density", "reading size", "resolution", and "document surfaces". In this case, the user fills in the five items of "address", "density", "reading size", "resolution", and "document surfaces". Next, the user sets a document to be transmitted, and presses a start button to execute the FAX transmission by the "FAX application B".

Similarly to FIG. 6B, the control unit 1 recognizes a state of operations of the user on the operation screen by various data obtained from the control apparatus 200. Specifically, the operational conditions set with the setting items relating to the "FAX application B" are transferred from the control apparatus 200 to the control unit 1. Next, the control unit 1 sets the operational conditions of the FAX 3 and the scanner 6 (FIG. 1) required for the FAX transmission, and executes the FAX transmission by predetermined steps. In this case, the operational conditions set when executing the FAX transmission are stored in the image forming apparatus.

Note that FIG. 6C is an example of a setting screen when not all operational conditions are taken over on the operational condition setting screen of the "FAX application B".

(Process Example or Operation Example of Embodiment)

FIGS. 7A-7B are diagrams illustrating an example of setting screens to select and set whether to take over operational conditions according to the first embodiment. In the following, an example will be described in which the "FAX application A" is executed, and then, the "FAX application B" is executed.

FIG. 7A is an example of a setting screen to select and set whether to take over operational conditions stored in the image forming apparatus 100 for the operational conditions relating to the FAX function included in the image forming apparatus 100. The application name "FAX application B" to be executed is displayed at the upper right of the screen in FIG. 7A. Further, in FIG. 7A, setting items required for executing the FAX function, and operational conditions stored in the image forming apparatus 100 are displayed for respective items as illustrated in FIG. 7A.

Specifically, setting items relating to the "FAX application A" are displayed as "address", "density", and "reading size" in FIG. 7A. Also, in FIG. 7A, "resolution" and "document surfaces" are displayed with initial values to be set for the "FAX application B".

Also, in FIG. 7A, buttons of "no takeover" and "takeover" are displayed to select whether to take over the setting contents. In this case, if the user determines not to take over all operational conditions, the user selects the "no takeover" button. On the other hand, if the user determines to take over a part of or all of the operational conditions, the user selects the "takeover" button.

FIG. 7B is an example of a setting screen when the "takeover" button has been selected in FIG. 7A. Specifically, the setting screen illustrated in FIG. 7B is a screen to select and set whether to take over operational conditions stored in the image forming apparatus 100 for the operational conditions relating to the FAX function included in the image forming apparatus 100 for respective items.

Similarly to FIG. 7A, the application name "FAX application B" to be executed is displayed at the upper right of the screen in FIG. 7B. Further, in FIG. 7B, similarly to FIG. 7A, setting items required for executing the FAX function, and operational conditions stored in the image forming apparatus 100 are displayed for respective items.

Also, in FIG. 7B, check buttons for a user to select items preferably taken over are displayed on the left side of the items of operational conditions. The user selects and checks the check boxes for the items preferably taken over. Note that if the user wants to take over all items, the user selects "ALL" button. Note that although the user selects the items preferably taken over in FIG. 7B, the user may select items not preferably taken over. Further, the boxes for displaying operational conditions may display pull-down menus as illustrated in the figure. In this case, when the user wants to change operational conditions, the user may make a selection with a pull-down menu to change the operational condition. Also, for those items that cannot be set with a pull-down menu such as an address, for example, character input may be enabled when the corresponding field of operational conditions is selected.

FIGS. 8A-8B are diagrams illustrating an example of setting screens to select and set whether to take over operational conditions when an error occurs according to the first embodiment.

FIG. 8A is an example of a screen to select and set whether to take over operational conditions stored in the image forming apparatus 100 (FIG. 1), for operational conditions relating to the FAX function included in the image forming apparatus 100 when an error occurs.

Note that an error occurs in cases where an item of the operational conditions stored in the image forming apparatus 100 is set with an operational condition that cannot be executed on the image forming apparatus 100, and the like. Namely, an error occurs when an item whose operational condition cannot be taken over is included.

In FIG. 8A, similarly to FIG. 7A, the application name "FAX application B" to be executed is displayed at the upper right of the screen. Further, in FIG. 8A, similarly to FIG. 7A, setting items required for executing the FAX function, and operational conditions stored in the image forming apparatus 100 are displayed for respective items.

In FIG. 8A, on the right side of an operational condition with which an error occurs, an icon indicating the error is displayed by characters of "ERR". Further, to make the erroneous operational condition easily recognizable by a user, the part of the erroneous operational condition is displayed with hatching in FIG. 8A. Note that the part of the erroneous operational conditions may be displayed with filling or the like.

FIG. 8A is an example where an error icon is displayed on the right side of an item of "reading size" among the operational condition. Specifically, FIG. 8A is an example where the image forming apparatus 100 can handle the reading size of up to A3, but cannot capture a document having the size of A2.

Also, in FIG. 8A, buttons of "no takeover" and "takeover" are displayed to select whether to take over the operational conditions. In this case, if the user determines not to take over all operational conditions, the user selects the "no takeover" button. On the other hand, if the user determines to take over a part of or all of the operational conditions, the user selects the "takeover" button.

FIG. 8B is an example of a setting screen when the "takeover" button has been selected in FIG. 8A. Specifically, the setting screen illustrated in FIG. 8B is a screen to select and set whether to take over operational conditions stored in the image forming apparatus 100 for the operational conditions relating to the FAX function included in the image forming apparatus 100 for respective items.

In FIG. 8B, similarly to FIG. 8A, the application name "FAX application B" to be executed is displayed at the upper right of the screen. Further, in FIG. 8B, similarly to FIG. 8A, setting items required for executing the FAX function, and operational conditions stored in the image forming apparatus 100 are displayed for respective items. Also, in FIG. 8B, similarly to FIG. 7B, check buttons for a user to select items preferably taken over are displayed on the left side of the items of operational conditions. In this case, the user selects and checks the check boxes for the items preferably taken over. Note that, if the user wants to take over all items, the user selects "ALL" button.

In FIG. 8B, similarly to FIG. 8A, on the right side of an operational condition with which an error occurs, an icon indicating the error is displayed by characters of "ERR". Also, similarly to FIG. 8A, the part of the erroneous operational condition is displayed with hatching.

Note that although the user selects the items preferably taken over in FIGS. 8A-8B, the user may select items not preferably taken over, similarly to FIGS. 7A-7B. Further, similarly to FIG. 7B, the boxes for displaying operational conditions may display pull-down menus as illustrated in the figure. In this case, when a user wants to change operational conditions, the user may make a selection with a pull-down menu to change the operational condition. Also, for those items that cannot be set with a pull-down menu such an address, for example, character input may be enabled when the corresponding field of operational conditions is selected.

Figure 9:
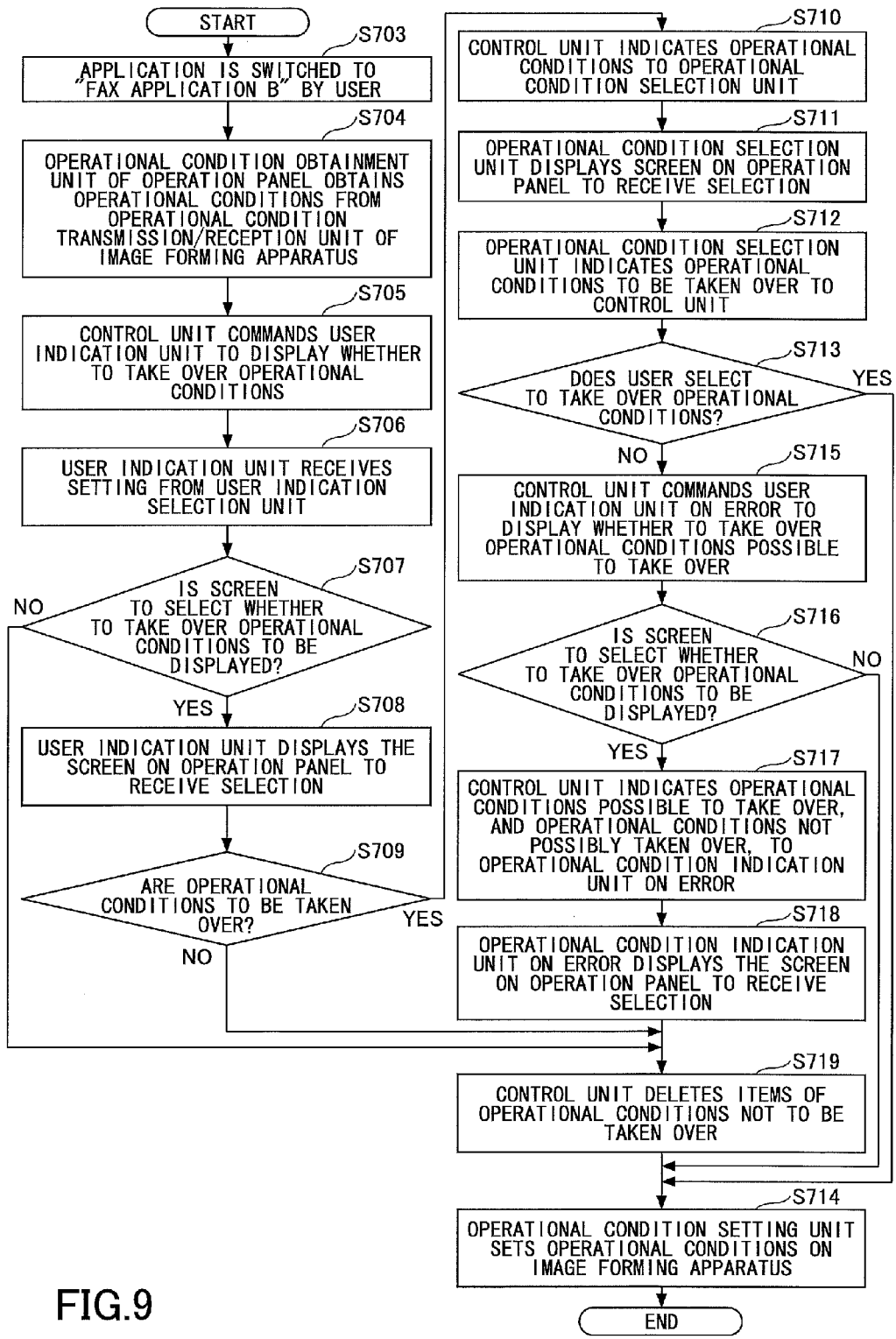
FIG. 9 is a diagram illustrating an example of a process to take over operational conditions of a FAX function according to the first embodiment.

FIG. 9 is a diagram illustrating an example of a process to take over operational conditions of the FAX function according to the first embodiment.

Operations will be described in detail by an example where a user operates the operation panel screen 206 (FIG. 3) of the control apparatus 200 (FIG. 3) to execute transmission by the "FAX application A", and then, to execute transmission by the "FAX application B". It will be described, following a flow of the process below.

The user has the "FAX application A" execute FAX transmission, operates the control apparatus 200 again, to display a menu screen of the application. In this case, the screen in FIG. 6A is displayed on the display screen of the control apparatus 200.

At Step S703, the user selects the "FAX application B" by the control apparatus 200. Specifically, when the "FAX application B" is selected by the user, the application of the control apparatus 200 is switched to the "FAX application B".

At Step S704, the operational condition obtainment unit 2001 transmits a request for providing operational conditions to the operational condition transmission/reception unit 1003 included in the image forming apparatus 100 connected with the control apparatus 200 via the network 300. Specifically, the operational condition transmission/reception unit 1003 included in the image forming apparatus 100 receives the request for providing operational conditions from the control apparatus 200. Next, the operational condition transmission/reception unit 1003 obtains the operational conditions from the operational condition storage unit 1001, and provides the operational conditions to the operational condition obtainment unit 2001. Further, the operational condition obtainment unit 2001 obtains operational conditions currently set from the operational condition transmission/reception unit 1003. Namely, at Step S704, the operational condition obtainment unit 2001 obtains the operational conditions relating to the "FAX application A".

Having obtained the operational conditions from the image forming apparatus 100, then at Step S705, the operational condition obtainment unit 2001 included in the control apparatus 200 indicates the operational conditions to the control unit 2002. Next, the control unit 2002 issues a command to the user indication unit 2004 to display a screen to select whether to take over operational conditions, based on the operational conditions obtained by the operational condition obtainment unit 2001.

Further, the user indication unit 2004 waits for a command whether to display a setting screen from the user indication selection unit 2006 of the control apparatus 200.

At Step S706, the user indication selection unit 2006 has the control apparatus 200 display a screen to select whether to display an "operational condition takeover setting screen", to receive selection by the user.

At Step S707, depending on the selection result by the user, the user indication selection unit 2006 issues a command to the user indication unit 2004 to display or not to display the "operational condition takeover setting screen". Note that when not displaying the "operational condition takeover setting screen", the control unit 2002 determines that the operational conditions are not to taken over, deletes items of operational conditions not to be taken over, and transitions to a state where no operational conditions are set.

Here, a case will be described where the user indication unit 2004 does not display the screen to select whether to take over the operational conditions (NO at Step S707). Namely, since all the operational conditions are not taken over, the operational conditions need to be set with respective initial values. In this case, the control unit 2002 goes forward to Step S719.

At Step S719, when not displaying the "operational condition takeover setting screen", the user indication selection unit 2006 indicates to the user indication unit 2004 that the "operational condition takeover setting screen" is not displayed. Further, in response to the indication that the "operational condition takeover setting screen" is not displayed from the user indication unit 2004, the control unit 2002 deletes items of operational conditions not to be taken over, and transitions to a state where no operational conditions are set.

At Step S714, the operational condition setting unit 2003 issues a command to set operational conditions to the operational condition storage unit 1001 included in the image forming apparatus 100 via the network 300. Specifically, the operational condition storage unit 1001 replaces the currently set operational conditions with the operational conditions transmitted from the control apparatus 200, to set them on the image forming apparatus 100.

Note that if there are items not having been set among the operational conditions transmitted from the control apparatus 200, the operational condition setting unit 2003 sets the initial values for those items on the image forming apparatus 100. Here, the user selects to take over nothing, and hence, the items of the operational conditions of the "FAX application B" are set with the initial values set by the "FAX application B" beforehand. Next, the setting screen of operational conditions relating to the "FAX application B" illustrated in FIG. 6C is displayed on the control apparatus 200. Here, the user sets the setting items of the operational conditions.

Next, a case will be described where the user indication unit 2004 displays a setting screen to select and set whether to take over operational conditions (YES at Step S707).

At Step S708, if the user indication unit 2004 displays the "operational condition takeover setting screen" by the selection by the user, the user indication selection unit 2006 issues a command to the user indication unit 2004 to display the "operational condition takeover setting screen". Next, the user indication unit 2004 displays a setting screen to select and set whether to take over operational conditions (see FIG. 7A) on the control apparatus 200 by the command of the user indication selection unit 2006. Further, the control unit 2002 is indicated by the user indication unit 2004 that the "operational condition takeover setting screen" has been displayed, and receives a selection by the user.

At Step S709, the control unit 2002 determines whether to take over operational conditions by the selection result by the user. If not taking over the operational conditions (NO at Step S709), the control unit 2002 goes forward to Step S719. At Step S719, if the user selects not to take over the operational conditions, the control unit 2002 deletes items of operational conditions not to be taken over, and transitions to a state where no operational conditions are set.

Next, at Step S714, the operational condition setting unit 2003 issues a command to the operational condition storage unit 1001 included in the image forming apparatus 100 to set the operational conditions via the network 300. Next, the operational condition storage unit 1001 replaces the currently set operational conditions with the operational conditions transmitted from the control apparatus 200 to set them on the image forming apparatus 100. Note that if there are items not having set among the operational conditions transmitted from the control apparatus 200, the operational condition setting unit 2003 sets the initial values for those items on the image forming apparatus 100.

On the other hand, if the user selects to take over the operational conditions (YES at Step S709), the control unit 2002 goes forward to Step S710.

At Step S710, the control unit 2002 indicates the operational conditions obtained from the image forming apparatus 100 to the operational condition selection unit 2005 of the control apparatus 200.

At Step S711, the operational condition selection unit 2005 displays a setting screen (see FIG. 7B) to select and set whether to take over operational conditions obtained from the image forming apparatus on the control apparatus 200, to receive a selection by the user.

At Step S712, the operational condition selection unit 2005 indicates the operational conditions to be taken over to the control unit 2002.

At Step S713, the control apparatus 200 has the user select whether to take over the operational conditions.

If the user selects to take over the operational conditions (YES at Step S713), the control unit 2002 goes forward to Step S714. In this case, the control unit 2002 issues a command to the operational condition setting unit 2003 included in the control apparatus 200 to set initial values for items that have not been set.

Next, at Step S714, the operational condition setting unit 2003 issues a command to the operational condition storage unit 1001 included in the image forming apparatus 100 to set the operational conditions via the network 300. Next, the operational condition storage unit 1001 replaces the currently set operational conditions with the operational conditions transmitted from the control apparatus 200 to set them on the image forming apparatus 100. Note that if there are items not having set among the operational conditions transmitted from the control apparatus 200, the operational condition setting unit 2003 sets the initial values for those items on the image forming apparatus 100.

On the other hand, if the user selects not to take over the operational conditions (NO at Step S713), the control unit 2002 goes forward to Step S715.

At Step S715, the control unit 2002 issues a command to the user indication unit on error 2007 to display whether to take over operational conditions possible to take over.

At Step S716, the user indication unit on error 2007 waits for a command whether to display a setting screen from the user indication selection unit on error 2008 included in the control apparatus 200. Next, the user indication selection unit on error 2008 displays a screen to select whether to display the "screen to select whether to take over operational conditions possible to take over" on the control apparatus 200, and receives a selection by the user. Further, based on the selection by the user, the user indication selection unit on error 2008 issues a command to the user indication unit on error 2007 to display or not to display the "screen to select whether to take over operational conditions possible to take over".

When not going to display the "screen to select whether to take over operational conditions possible to take over" (NO at Step S716), the control unit 2002 goes forward to Step S719.

At Step S719, the user indication selection unit on error 2008 indicates to the user indication unit on error 2007 that the "screen to select whether to take over operational conditions possible to take over" is not to be displayed. Next, in response to the indication that the "screen to select whether to take over operational conditions possible to take over" is not to be displayed from the user indication unit on error 2007, the control unit 2002 deletes items of operational conditions not to be taken over, and transitions to a state where no operational conditions are set.

Next, at Step S714, the operational condition setting unit 2003 issues a command to the operational condition storage unit 1001 of the image forming apparatus 100 to set operational conditions via the network 300. The operational condition storage unit 1001 replaces the currently set operational conditions with the operational conditions transmitted from the control apparatus 200 to set them on the image forming apparatus 100. Note that if there are items not having set among the operational conditions transmitted from the control apparatus 200, the operational condition setting unit 2003 sets the initial values for those items on the image forming apparatus 100.

On the other hand, when going to display the "screen to select whether to take over operational conditions possible to take over" (YES at Step S716), the control unit 2002 goes forward to Step S717.

At Step S717, the user indication selection unit on error 2008 issues a command to the user indication unit on error 2007 to display the screen. Next, when receiving the command from the user indication selection unit on error 2008, the user indication unit on error 2007 displays the "screen to select whether to take over operational conditions possible to take over" on the control apparatus 200. Further, the control unit 2002 is indicated by the user indication unit on error 2007 that the "screen to select whether to take over only the operational conditions possible to take over" has been displayed, and the control unit 2002 receives a selection by the user. Also, receiving the selection result by the user having determined whether to take over operational conditions possible to take over, the control unit 2002 indicates operational conditions possible to take over, and operational conditions not possible to take over, to the operational condition indication unit on error 2009.

At Step S718, the operational condition indication unit on error 2009 displays the operational conditions possible to take over, and the operational conditions not possible to take over, and displays a setting screen to select and set whether to take over operational conditions possible to take over (see FIG. 8B). Next, the operational condition indication unit on error 2009 receives a selection by the user on the setting screen to select and set whether to take over operational conditions possible to take over.

At Step S719, the control unit 2002 receives the selection whether to take over operational conditions from the operational condition indication unit on error 2009, deletes items of operational conditions not to be taken over, and transitions to a state where no operational conditions are set.

Next, at Step S714, the operational condition setting unit 2003 issues a command to the operational condition storage unit 1001 of the image forming apparatus 100 to set operational conditions via the network 300. The operational condition storage unit 1001 replaces the currently set operational conditions with the operational conditions transmitted from the control apparatus 200 to set them on the image forming apparatus 100. Note that if there are items not having set among the operational conditions transmitted from the control apparatus 200, the operational condition setting unit 2003 sets the initial values for those items on the image forming apparatus 100.

Note that, at Step S713, the control unit 2002 checks whether there are items having errors in the operational conditions. In FIG. 9, although Steps S715 and after are executed when the operational conditions have errors, the control unit 2002 may execute Steps S704 and after to obtain the operational conditions from the image forming apparatus. Further, when there are items having errors in the operational conditions, the control unit 2002 may display the setting screen illustrated in FIG. 8A and FIG. 8B.

Also, the control apparatus 200 or the image forming apparatus 100 may store information illustrated in Table 1 below.

TABLE 1

| NAME | FUNCTION | SETTING ITEM | OPERATIONAL CONDITION | LAST ACTIVATED TIME |
|---|---|---|---|---|
| FAX APP A | FAX | ADDRESS DENSITY READING SIZE | RESOLUTION:FINE DOCUMENT SURFACES:SINGLE SURFACE | Nov. 2, 2014 10:52:30 |
| FAX APP B | FAX | ADDRESS DENSITY RESOLUTION | — | Nov. 1, 2014 9:11:54 |

TABLE 1-continued

| NAME | FUNCTION | SETTING ITEM | OPERATIONAL CONDITION | LAST ACTIVATED TIME |
|---|---|---|---|---|
| COPY APP A | COPIER | READING SIZE DOCUMENT SURFACES DENSITY READING SIZE DOCUMENT SURFACES • OUTPUT SURFACES AGGREGATION STAPLE OUTPUT SIZE COLOR | RESOLUTION:FINE | Nov. 1, 2014 6:52:30 |
| COPY APP B | COPIER | DENSITY DOCUMENT SURFACES • OUTPUT SURFACES AGGREGATION STAPLE MAGNIFICATION/REDUCTION RATIO COLOR RESOLUTION | — | Nov. 2, 2014 11:27:30 |

Table 1 stores information in which the "name", "function", "setting item", "operational condition", and "final activation time", and the like are associated with other for each application.

The "name" is a name of an application. Note that the "name" may be information that identifies the application. For example, the "name" may be an ID (identification) information.

The "function" is information that indicates which application corresponds to a function included in the image forming apparatus 100. Note that one application may correspond to multiple functions (for example, copying and FAX).

The "setting item" is information about items that can be set for an application.

The "operational condition" is information about items that are determined by the application in advance without a selection by a user.

The "final activation time" is information about time when the application has been executed last.

The control apparatus 200 or the image forming apparatus 100 may identify an application for takeover using the information in Table 1. In the previous description, although the operational conditions relating to the "FAX application A" has been obtained when executing the "FAX application B", the operational conditions may be obtained from another application using the information in Table 1. For example, among applications that have the same function as the "FAX application B" to be executed (namely, applications corresponding to FAX), an application that has been executed most recently may be determined as the application from which the setting items are taken over.

Also, for example, when the "FAX application B" is to be executed, an application that has been executed most recently among all applications including copy applications and the like may be determined as the application from which the setting items are taken over (in this case, the "copy application B").

Further, an application that has been executed most recently among applications including one or more of the setting items of an application to be executed may be determined as the application from which the setting items are taken over.

The control apparatus 200 or the image forming apparatus 100 may execute these processes at Step S704 in FIG. 9, to obtain the operational conditions relating to the determined application.

Note that if no applications have been executed within a predetermined period of time, the control apparatus 200 or the image forming apparatus 100 may not take over settings.

As described above, there are cases where the control apparatus 200 or the image forming apparatus 100 executes FAX transmission consecutively by the "FAX application A" and the "FAX application B". In this case, the control apparatus 200 or the image forming apparatus 100 can execute its FAX function, with switching multiple applications while taking over the operational conditions. Similarly, the control apparatus 200 or the image forming apparatus 100 can execute predetermined functions included in the image forming apparatus 100 with switching multiple applications while taking over the operational conditions.

Also, when a user uses the image forming apparatus using one application, the image forming apparatus may store the operational conditions executed last, and may select whether to take over the operational conditions used for the previous time.

According to at least one embodiment of the present invention, a user can select whether to take over operational conditions, and the user can save the trouble of resetting. Also, since the user can select operational conditions which the user wants to take over, the user can save the trouble of setting the operational conditions again. Further, if there are operational conditions not possible to take over, the user can select the operational conditions on a setting screen where the operational conditions not possible to take over are explicitly displayed. Therefore, using the control apparatus or the image forming apparatus, the user can reduce erroneous settings of operational conditions.

Modified Example of Embodiment

Note that when executing a function of FAX transmission or the like, operational conditions may include personal information such as a destination address. In this case, if the operational conditions are set including important information such as the personal information, the control apparatus encrypts the important information using an encrypt unit.

Further, when setting the operational conditions on the image forming apparatus, the control apparatus may store an encrypted information and a decryption code in a pair for the important information. Since the decryption code is entered on the control apparatus by the user when setting the operational conditions, it may not be easily obtained by others. In this case, the image forming apparatus decrypts the encrypted important information using the decryption code. Next, the image forming apparatus sets the decrypted important information as the operational conditions, to execute a function. Further, after having executed the function, the image forming apparatus stores the encrypted information, and deletes the decryption code.

Note that when using the encrypted information for a takeover, the image forming apparatus may have the user to set a decryption code again. For example, when a screen to select a takeover is displayed, the user may input a decryption code. In this case, the image forming apparatus can display the personal information for the user on the setting screen in a decrypted state. In this way, when important information such as personal information is included in operational conditions, by storing encrypted information and a decryption code in a pair in the image forming apparatus, it is possible to make it difficult for others to use the important information when the operational conditions are taken over on the control apparatus or the image forming apparatus.

Note that an embodiment of the present invention may be implemented on a control apparatus that has a display function and a communication function, for example, a cellular phone, a smart phone, or a tablet, by installing a program having the function described above. Specifically, the control apparatus may be set capable of executing the function described above by the program. In this case, the image forming apparatus 100 makes a connection with the cellular phone, smart phone, tablet, or the like via a communication network such as infrared communication, wireless communication, or a USB (Universal Serial Bus), or the like using the communication control unit 111. Namely, the image forming apparatus 100 may have the connected cellular phone, smart phone, tablet, or the like execute a part of or all of the functions included in the image forming apparatus 100.

Also, the control apparatus may be implemented in the image forming apparatus as an operation panel unit. In this case, the operation panel unit and the image forming apparatus may be connected with each other by an internal network, or may directly communicate with each other.

Further, by recording the program to execute the control procedure described in the first embodiment described above in a recording medium, various processes relating to the control procedure may be executed by a computer.

Also, it is possible to implement the control process described above, by recording the program on a recording medium, and having a computer or a mobile terminal apparatus read the recording medium that records the program. Note that as a recording medium, various types of recording media can be used including a CD-ROM, a flexible disk, an optical magnetic disk, a semiconductor memory, and the like.

Further, the present invention is not limited to the embodiments described above, but various variations and modifications may be made without departing from the scope of the present invention.

The present application is based on and claims the benefit of priority of Japanese Priority Application No. 2013-261411 filed on Dec. 18, 2013, and Japanese Priority Application No. 2014-248597 filed on Dec. 9, 2014, with the Japanese Patent Office, the entire contents of which are hereby incorporated by reference.

What is claimed is:

1. A control apparatus configured to control operational conditions of functions that are executed by an application of an image forming apparatus, comprising: one or more hardware processors; and one or more memories containing instructions that, when executed, cause the one or more hardware processors to: store, after a first function is fully executed without any error by a first application using a first operational condition, identification information of the first application, the first function executed by the first application, and the first operational condition, in association with each other, and store, after a same function as the first function is fully executed without any error by a second application using a second operational condition; identification information of the second application, the same function executed by the second application, and the second operational condition, in association with each other; wherein the identification information of the first application, the first function executed by the first application and the first operational condition are stored in association with each other after the same function is fully executed without any error by the second application using the second operational condition; obtain, when the first application is executed, the second operational condition that is stored in association with the identification information of the second application; display an operational condition setting screen for setting operational conditions corresponding to functions to be executed by the first application, wherein said operational condition setting screen displays, when the first application is executed, the obtained second operational condition, and enables a selection of whether to reuse the displayed second operational condition that was used by the second application when executing the same function; and control the operational conditions to execute the function based on the operational conditions set on the operational condition setting screen; wherein the obtained second operational condition that is displayed on the operational condition setting screen when the first application is executed is a non-default value that is set by a user before the execution of the same function by the second application, and that is used thereafter by the second application to execute the same function.

2. The control apparatus as claimed in claim 1, wherein:
the instructions, when executed, cause the one or more hardware processors to obtain a plurality of second operational conditions, each of the second operational conditions among the plurality of second operational conditions stored in association with the identification information of the second application and the same function executed by the second application; and
on the operational condition setting screen, the user can select whether to reuse each second operational condition among the obtained plurality of second operational conditions.

3. The control apparatus as claimed in claim 1, wherein:
the instructions, when executed, cause the one or more hardware processors to obtain a plurality of second operational conditions, each of the second operational conditions among the plurality of second operational conditions stored in association with the identification information of the second application and the same function executed by the second application; and
when the plurality of obtained second operational conditions includes an operational condition that cannot be reused, the operational condition setting screen replaces the operational condition that cannot be reused with an operational condition set in advance.

4. The control apparatus as claimed in claim 1, wherein the control apparatus includes an operation panel installed in the image forming apparatus.

5. A non-transitory computer-readable recording medium having a program stored therein for causing a control apparatus to execute a process to control operational conditions of functions that are executed by an application of an image forming apparatus, the process comprising: storing, after a first function is fully executed without any error by a first application using a first operational condition, identification information of the first application, the first function executed by the first application, and the first operational condition, in association with each other; storing, after a same function as the first function is fully executed without any error by a second application using a second operational condition, identification information of the second application, the same function executed by the second application, and the second operational condition, in association with each other; wherein the identification information of the first application, the first function executed by the first application and the first operational condition are stored in association with each other after the same function is full executed without any error by the second application using the second operational condition; obtaining, when the first application is executed, the second operational condition that is stored in association with the identification information of the second application; displaying an operational condition setting screen for setting operational conditions corresponding to functions to be executed by the first application, wherein said operational condition setting screen displays, when the first application is executed, the obtained second operational condition, and enables a selection of whether to reuse the displayed second operational condition that was used by the second application when executing the same function; and controlling the operational conditions to execute the function based on the conditions set on the operational condition setting screen wherein the obtained second operational condition that is displayed on the operational condition setting screen when the first application is executed is a non-default value that is set by a user before the execution of the same function by the second application, and that is used thereafter by the second application to execute the same function.

* * * * *